United States Patent
Foroughi et al.

(10) Patent No.: US 11,636,287 B2
(45) Date of Patent: Apr. 25, 2023

(54) LEARNING FORM-BASED INFORMATION CLASSIFICATION

(71) Applicants: Homa Foroughi, Edmonton (CA); Joy Rimchala, Mountain View, CA (US)

(72) Inventors: Homa Foroughi, Edmonton (CA); Joy Rimchala, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1399 days.

(21) Appl. No.: 15/938,623

(22) Filed: Mar. 28, 2018

(65) Prior Publication Data

US 2019/0303727 A1 Oct. 3, 2019

(51) Int. Cl.
| | | |
|---|---|---|
| G06F 17/00 | (2019.01) | |
| G06K 9/62 | (2022.01) | |
| G06N 7/00 | (2023.01) | |
| G06N 20/00 | (2019.01) | |
| G06F 40/284 | (2020.01) | |

(52) U.S. Cl.
CPC ......... *G06K 9/6267* (2013.01); *G06F 40/284* (2020.01); *G06K 9/6256* (2013.01); *G06N 7/005* (2013.01); *G06N 20/00* (2019.01)

(58) Field of Classification Search
CPC .. G06K 9/6267; G06K 9/5256; G06K 9/6256; G06N 20/00; G06N 7/005; G06N 3/084; G06N 3/0445; G06F 40/284; G06F 40/30; G06F 40/216
USPC .......................................................... 706/12
See application file for complete search history.

(56) References Cited

U.S. PATENT DOCUMENTS

| | | | | |
|---|---|---|---|---|
| 2015/0199333 | A1* | 7/2015 | Nekhay | G06F 40/268 704/9 |
| 2016/0226813 | A1* | 8/2016 | Cecchi | G06N 20/00 |
| 2017/0109355 | A1* | 4/2017 | Li | G06N 5/022 |
| 2017/0315984 | A1* | 11/2017 | Goyal | G06F 40/30 |
| 2017/0364503 | A1* | 12/2017 | Anisimovich | G06F 40/30 |
| 2018/0053107 | A1* | 2/2018 | Wang | G06N 3/084 |
| 2018/0225281 | A1* | 8/2018 | Song | G06F 40/253 |
| 2019/0188647 | A1* | 6/2019 | Gariel | G06Q 10/1053 |

OTHER PUBLICATIONS

Andrey Kutuzov, "Distributional Semantics: Extracting Meaning from Data, Lecture 1: Linguistic Foundations of Distributional Semantics", Oct. 26, 2016 (10 pages).
Tomas Mikolov et al., "Efficient Estimation of Word Representations in Vector Space", Sep. 7, 2013 (12 pages).
Charles Sutton et al., "An Introduction to Conditional Random Fields", Jan. 1, 2011 (109 pages).
Roder et al., "Exploring the Space of Topic Coherence Measures", Feb. 2-6, 2015 (10 pages).

* cited by examiner

*Primary Examiner* — Jason T Edwards
(74) *Attorney, Agent, or Firm* — Ferguson Braswell Fraser Kubasta PC

(57) ABSTRACT

A method may include extracting training tokens from a training corpus, generating training token features and training contextual features for each of the training tokens, training a probabilistic graphical model using classes, the training token features, and the training contextual features, extracting, from actual data, actual tokens including an actual token, generating actual token features and actual contextual features for each of the actual tokens, and classifying the actual token as a class using the probabilistic graphical model, the actual token features, and the actual contextual features.

20 Claims, 15 Drawing Sheets

Field Value for SSN
136

Field Title for Employee's SSN
132

22222 a Employee's social security number
5042971250 b Employer identification number (EIN)
2038340839 c Employer's name, address, and ZIP code

07345 James Manor
West Victoriachester, UT 25417 d Control number
1427 e Employee's first name and initial    Last name

Gina Osborn
0170 Vazquez Station Suite 475
Rasmussentown, NM 87497-3543 f Employee's address and ZIP code

| 15 State | Employer's state ID number | 16 State wages, tips, etc. |
| IN | 2766757493 | 6571.25 |

Field Value for Local Wage
146

Field Title for State wages, tips, etc.
142

FIG. 1B

Semantic Space
165

Co-Occurrence Matrix 170

A simple example of a symmetric word-word co-occurrence matrix:

|   | vector | meaning | hamster | corpus | weasel | animal |
|---|---|---|---|---|---|---|
| vector | 0 | 10 | 0 | 8 | 0 | 0 |
| meaning | 10 | 0 | 1 | 15 | 0 | 0 |
| hamster | 0 | 1 | 0 | 0 | 20 | 14 |
| corpus | 8 | 15 | 0 | 0 | 0 | 2 |
| weasel | 0 | 0 | 20 | 0 | 0 | 21 |
| animal | 0 | 0 | 14 | 2 | 21 | 0 |

We produced meaningful representations in a completely unsupervised way!

LEARNING FORM-BASED INFORMATION CLASSIFICATION

BACKGROUND

Techniques for extracting and classifying information (e.g., Naïve Bayes and maximum entropy classifiers, Hidden Markov Models) from form-based documents or images are often heuristic-based and/or assume that features associated with extracted entities are independent. After extracting (e.g., via optical character recognition (OCR)) text from document images, there is a need for a trainable, adaptable, and reliable model for information extraction and classification.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting training tokens from a training corpus, generating training token features and training contextual features for each of the training tokens, training a probabilistic graphical model using classes, the training token features, and the training contextual features, extracting, from actual data, actual tokens including an actual token, generating actual token features and actual contextual features for each of the actual tokens, and classifying the actual token as a class using the probabilistic graphical model, the actual token features, and the actual contextual features.

In general, in one aspect, one or more embodiments relate to a system including a computer processor and a repository configured to store a training corpus, actual data, and classes including a class. The system further includes a token extractor executing on the computer processor configured to extract training tokens from the training corpus, and extract, from the actual data, actual tokens including an actual token. The system further includes a feature generator executing on the computer processor configured to generate training token features and training contextual features for each of the training tokens, and generate actual token features and actual contextual features for each of the actual tokens. The system further includes a classifier including a probabilistic graphical model and executing on the computer processor. The classifier is configured to train the probabilistic graphical model using the classes, the training token features, and the training contextual features, and classify the actual token as the class using the probabilistic graphical model, the actual token features, and the actual contextual features.

In general, in one aspect, one or more embodiments of the invention relate to a non-transitory computer readable medium including instructions that, when executed by a processor, perform extracting training tokens from a training corpus, generating training token features and training contextual features for each of the training tokens, training a probabilistic graphical model using classes, the training token features, and the training contextual features, extracting, from actual data, actual tokens including an actual token, generating actual token features and actual contextual features for each of the actual tokens, and classifying the actual token as a class using the probabilistic graphical model, the actual token features, and the actual contextual features.

Other aspects of the invention will be apparent from the following description and the appended claims.

BRIEF DESCRIPTION OF DRAWINGS

FIGS. 1A, 1B, 1C, 1D, 1E, 1F, 1G, 1H, 1I, and 1J show a system in accordance with one or more embodiments of the invention.

DETAILED DESCRIPTION

Figure 1A:
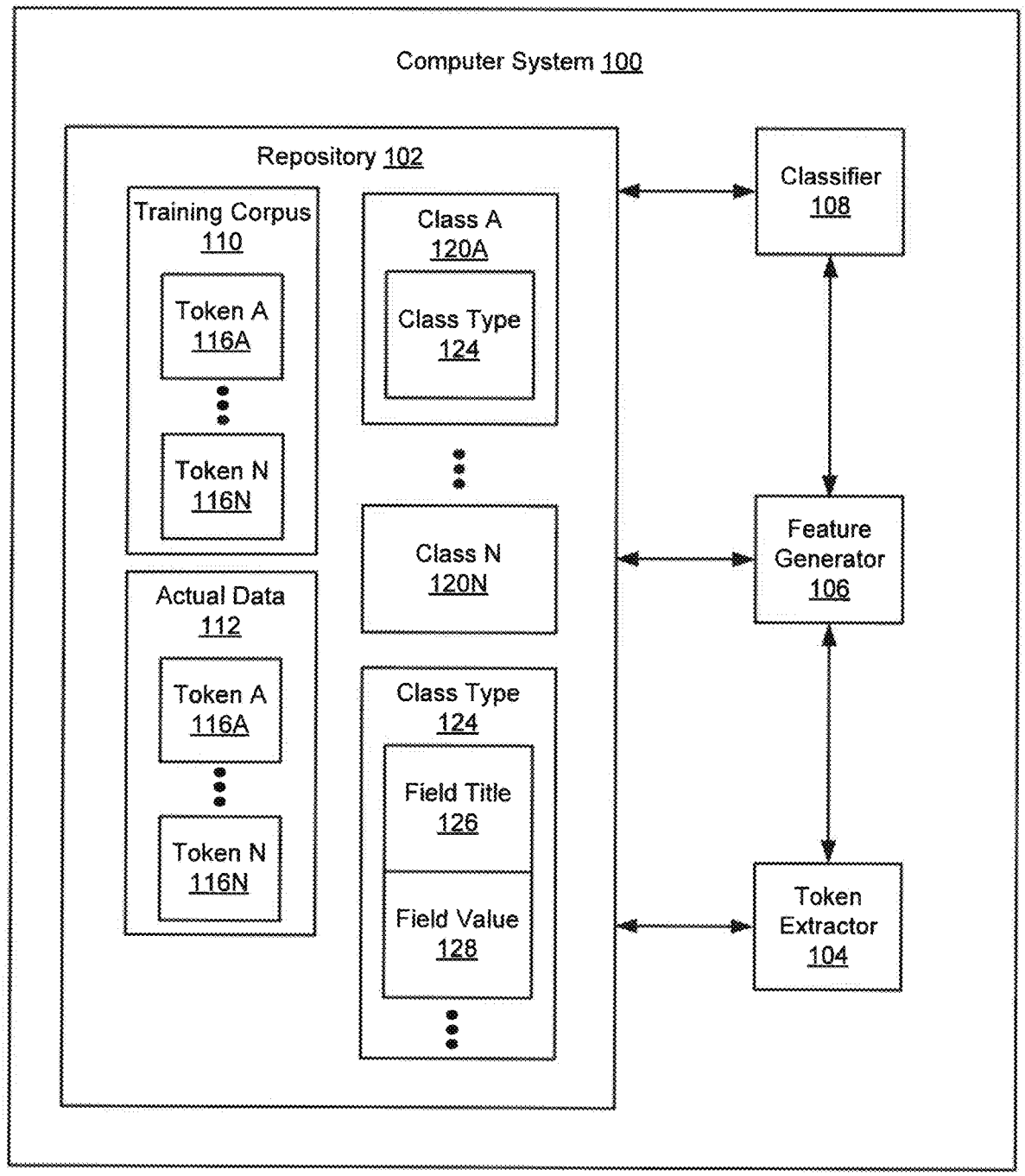

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system, method, and non-transitory computer readable medium for form-based information classification. In one or more embodiments, the classification is performed using a probabilistic graphical model trained using features generated from tokens extracted from a training corpus, relative to a set of classes each having a class type. The probabilistic graphical model may be based on a linear-chain conditional random field (CRF) model that treats classification as a sequence-prediction problem. The generated features may include token features that are intrinsic to each token (e.g., token length, prefix, suffix, part of speech, etc.), as well as contextual features that express relationships among tokens (e.g., clusters in a multi-dimensional semantic space, latent topics, etc.). The trained probabilistic graphical model may be used to classify tokens extracted from actual data using features generated from the actual tokens. The probabilistic graphical model may classify tokens using feature functions that include predicates that examine the features and classes associated with the tokens.

FIG. 1A shows a computer system (100) in accordance with one or more embodiments of the invention. As shown in FIG. 1A, the computer system (100) includes a repository (102), a token extractor (104), a feature generator (106), and a classifier (108). In one or more embodiments, the token extractor (104), feature generator (106) and/or classifier (108) take the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a training corpus (110), actual data (112), and classes (120A, 120N). The training corpus (110) may be based on synthetic data, such as data devoid of personally identifiable information (PII) associated with one or more individuals and/or organizations. In one or more embodiments, the training corpus (110) may be based on actual data (112). The actual data (112) may include personally identifiable information.

In one or more embodiments, the training corpus (110) may be based on information extracted from one or more forms (e.g., tax forms). For example, optical character recognition (OCR) techniques may be used to extract raw text from an image of a form. Continuing this example, the training corpus (110) may be generated based on the raw text, after post-processing of the OCR results is performed, and assembling the resulting tokens (116A, 116N) into a body of text for each training instance. For example, the post-processing may include: aggregation of field titles that were divided into several lines of text, removing numeric values to build an unannotated version of the training corpus (110), removing spaces, etc.

In one or more embodiments, the training corpus (110) includes tokens (116A, 116N). In one or more embodiments, the actual data (112) includes tokens (116A, 116N). Each token (116A) may be an alphanumeric string. For example, a token (116A) may include a single word (e.g., Michigan), multiple words (e.g., state wages), a numerical expression (e.g., 87632.54), etc.

In one or more embodiments, different versions of the training corpus (110) may be used to train different machine learning models. In one or more embodiments, an annotated version of the training corpus (110) is used, where tokens (116A, 116N) are labeled with their corresponding classes (120A, 120N) (e.g., to support supervised learning). In one or more embodiments, an un-annotated version of the training corpus (110) is used, where tokens (116A, 116N) are not labeled with their corresponding classes (120A, 120N). For example, the classifier (108) may use an annotated version of the training corpus (110) to train the probabilistic graphical model (164). As another example, the feature generator (106) may use an un-annotated version of the training corpus (110) when generating contextual features (154A, 154N). Also, the feature generator (106) may use an annotated version of the training corpus (110) when generating token features (152A, 152N).

Continuing with FIG. 1A, in one or more embodiments, classes (120A, 120N) are categories into which a token (116A) may be classified. Each class (120A, 120N) may include a class type (124). The class type (124) may represent a grouping of classes (120A, 120N) having a common characteristic. For example, the common characteristic may be that each class (120A) in a group of classes (120A, 120N) is used as a title of a field in a form. Alternatively, the common characteristic may be that each class (120A) in a group of classes (120A, 120N) is used as a value of a field in a form. In one or more embodiments, the class type (124) may be field title (126), field value (128), field instructions, etc.

Examples of classes (120A, 120N) whose class type (124) is field title (126) (e.g., relative to a training corpus (110) of W-2 tax forms) may include: field title for social security wages box, field title for control number, field title for employer identification number (EIN), etc. Examples of classes (120A, 120N) whose class type (124) field value (128) may include: field value for social security number, field value for employer identification number (EIN), field value for wage amount, field value for employee address, etc. FIG. 1B shows a class "field title for Employee's social security number" (132) in a W-2 form whose class type is field title (126). FIG. 1B also shows a class "field value for social security number" (136) whose class type is field value (128). In addition, FIG. 1B shows a class "State wages, tips, etc.," (142) whose class type is field title (126), and a class "local wage" (146) whose class type is field value (128).

Returning to FIG. 1A, in one or more embodiments, the token extractor (104) may be implemented in hardware (e.g., circuitry), software, firmware, and/or any combination thereof. In one or more embodiments, the token extractor (104) includes functionality to extract tokens (116A, 116N) from a training corpus (110). In one or more embodiments, the token extractor (104) includes functionality to extract tokens (116A, 116N) from actual data (112). A variety of techniques may be used to implement the token extractor (104), including: named entity recognition (NER), rule-based techniques, statistics-based techniques, classification techniques (e.g., Naïve Bayes classification), logistic regression, etc.

Figure 1C:
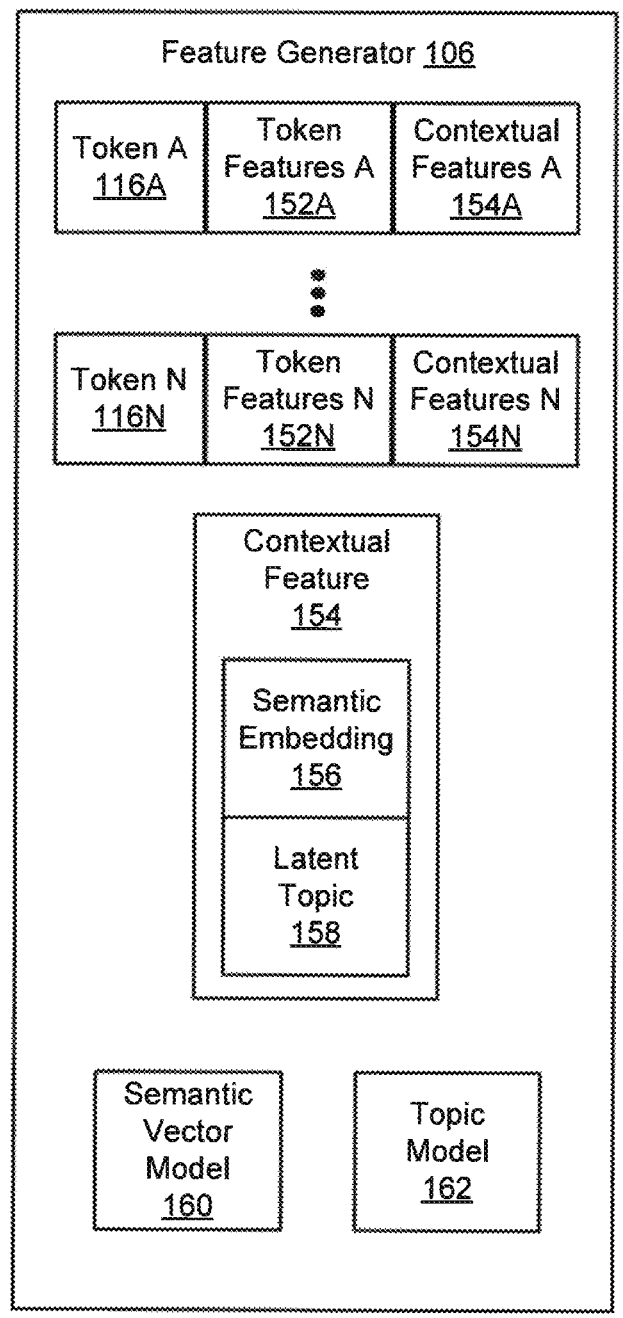
Figure 1D:
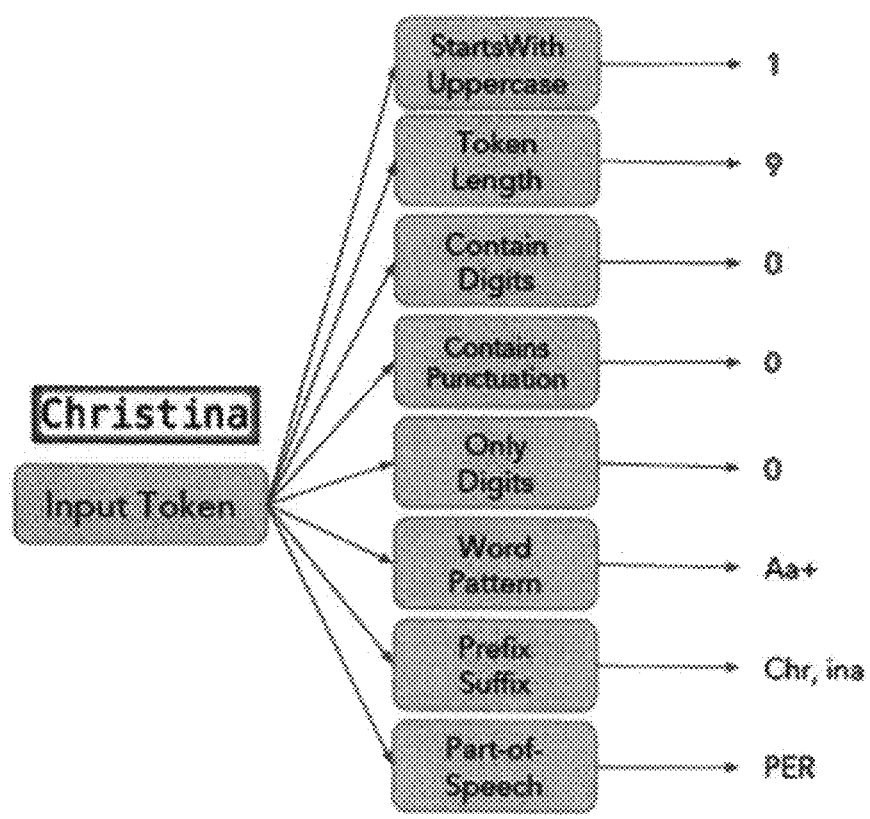

Turning to FIG. 1C, in one or more embodiments, the feature generator (106) may be implemented in hardware (e.g., circuitry), software, firmware, and/or any combination thereof. In one or more embodiments, the feature generator (106) includes functionality to generate token features (152A, 152N) and contextual features (154A, 154N) for tokens (116A, 116N). Token features (152A) may represent intrinsic attributes of the corresponding token (116A). As illustrated in FIG. 1D, token feature examples (155) may include: token length, prefix, suffix, part of speech (POS), pattern (e.g., regular expression pattern), a flag indicating whether the token (116A) includes digits, a flag indicating whether the token (116A) includes punctuation, spatial position of the token (116A) (e.g., the coordinates of the token (116A) within a form), etc.

Returning to FIG. 1C, in one or more embodiments, generating the token features (152A) for one token (116A) may be performed independently from the generation of token features (152N) for any other token (116N). The token features (152A, 152N) may be generated (e.g., learned) using an annotated version of the training corpus (110). For example, tokens (116A, 116N) in the annotated version of the training corpus (110) may be annotated with their corresponding classes (120A, 120N).

Figure 1E:
Figure 1E:
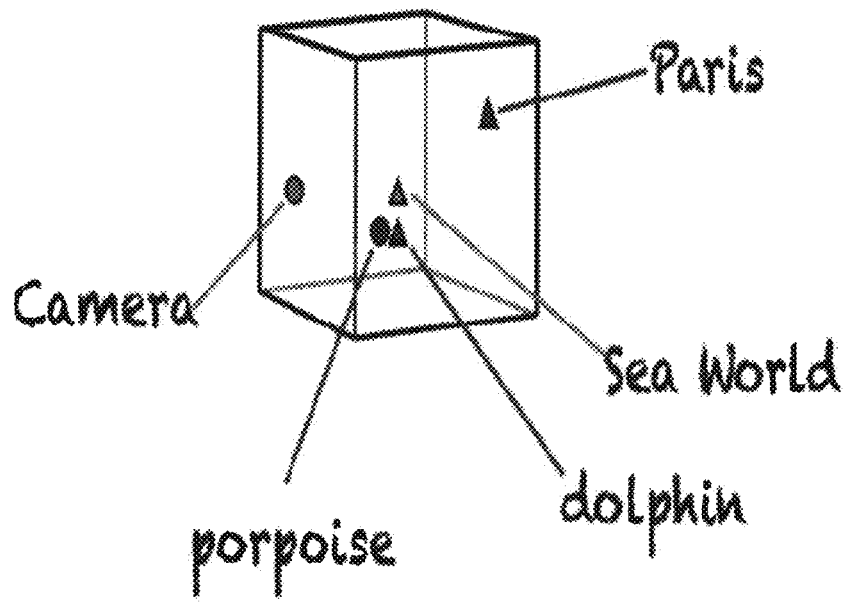

Contextual features (154A) may represent attributes of the token (116A) that are inter-related with neighboring tokens. One example of a contextual feature (154) is a semantic embedding (156) of a semantic vector model (160). The semantic vector model (160) may define a multi-dimensional semantic space. In one or more embodiments, a token (116A) may be mapped to a vector (e.g., a point or an embedding) that represents the token (116A) in the multi-dimensional semantic space. For illustrative purposes, such a semantic space (165) is shown in FIG. 1E ("Distributional Semantics: Extracting Meaning from Data, Lecture 1: Linguistic Foundations of Distributional Semantics (University of Oslo, 26 Oct. 2016), Andrey Kutuzov") (hereafter "Distributional Semantics"). In one or more embodiments, the value assigned to each dimension of a vector corresponding to a token (116A) may be based on the co-occurrence of the token (116A) with another token within a context window in a training corpus (110). In one or more embodiments, the value assigned to each dimension of a vector is a real value.

Figure 1F:

In one or more embodiments, tokens (116A, 116N) that appear in similar contexts will be in a semantic embedding (156) of vectors that are near each other in the multi-dimensional semantic space (e.g., as measured by a semantic distance function based on cosine similarity). For illustrative purposes, FIG. 1F from Distributional Semantics shows a symmetric word-word (e.g., token-token) co-occurrence matrix (170). The semantic embedding (156) may be formed using various cluster analysis techniques (e.g., k-means clustering, centroid-based clustering, hierarchical clustering, distribution-based clustering, density-based clustering, etc.).

In one or more embodiments, the semantic vector model (160) may be implemented using open-source software, such as Word2Vec at Google Code, which is based on Mikolov et al., "Efficient Estimation of Word Representations in Vector Space" (Sep. 7, 2013), GloVe, which is based on Pennington et al., "GloVe (Global Vectors for Word Representation)" (2014).

Figure 1G:
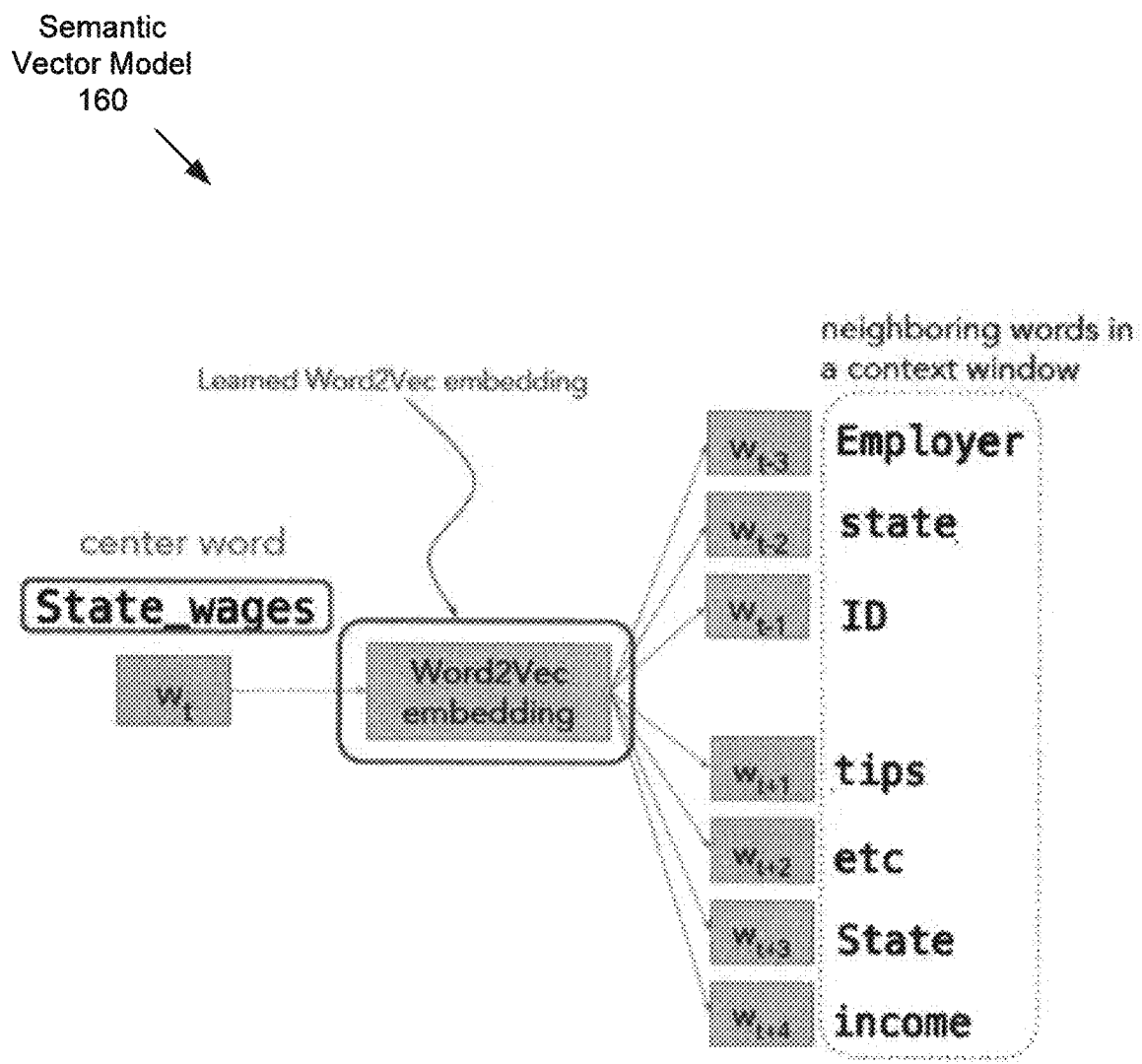

In one or more embodiments, the semantic vector model (160) is based on the skip-gram variant of Word2Vec, with negative sampling and hierarchical SoftMax. The semantic vector model (160) may learn embeddings (e.g., lower-dimensional vector representations) of tokens (116A, 116N) to predict surrounding tokens from a given center token, as illustrated in FIG. 1G. The semantic embeddings (156) may be learned during the training phase of the semantic vector model (160). In one or more embodiments, the semantic embedding (156) associated with a token (116A) is the closest semantic embedding (156) to the vector corresponding to the token (116A) in the learned semantic embeddings. In one or more embodiments, each semantic embedding (156) is identified by a cluster identifier.

Figure 1H:
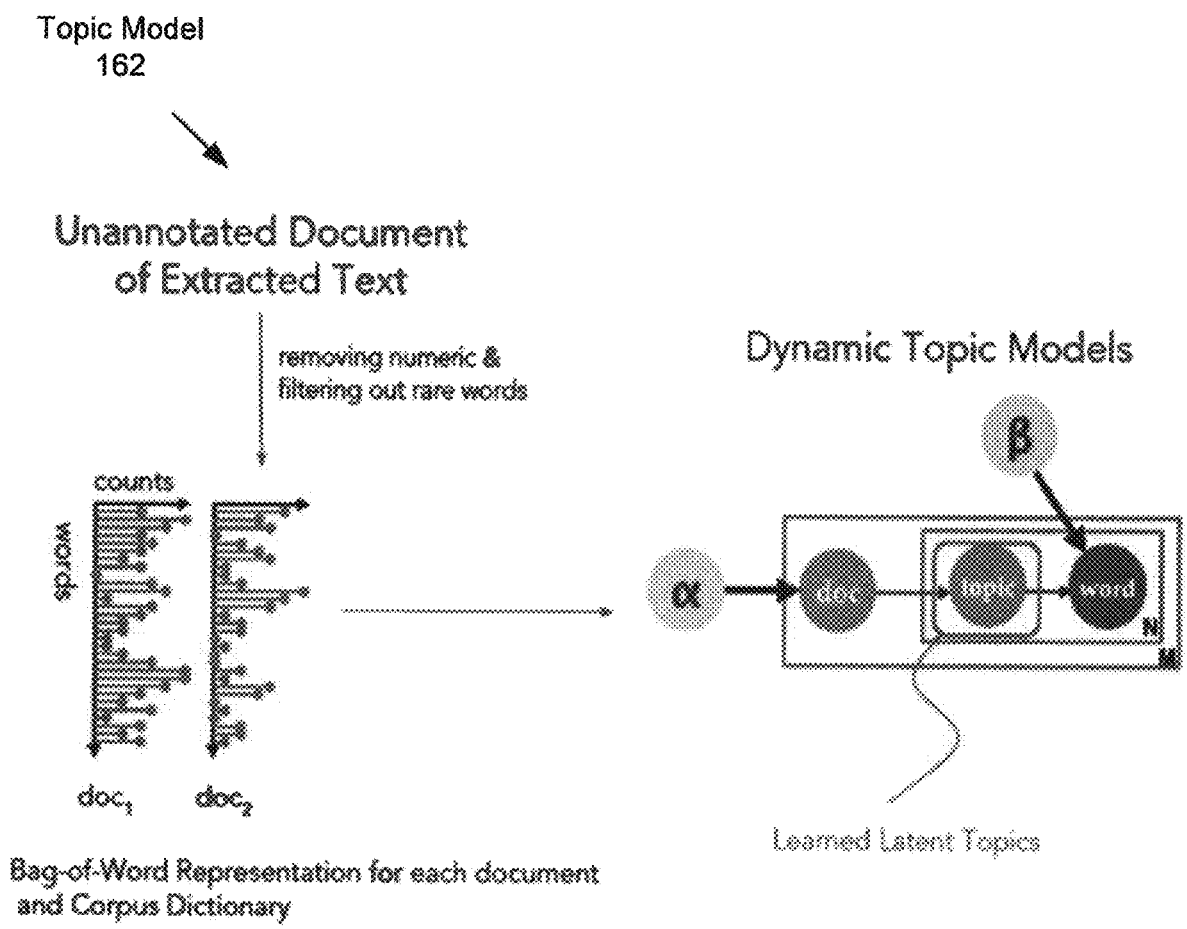

Returning to FIG. 1C, in one or more embodiments, another example of a contextual feature (154) is a latent topic (158) (e.g., a theme) implied by a token (116A) relative to a topic model (162). A latent topic (158) may be associated with tokens (116A, 116N) that are semantically related. As illustrated in FIG. 1H, the topic model (162) may define probability distributions of latent topics (158) over a training corpus (110). The topic model (162) may also define probability distributions of latent topics (158) over tokens (116A, 116N) extracted from the training corpus (110). In one or more embodiments, the topic model (162) may use a bag-of-words representation to represent the tokens (116A, 116N) extracted from the training corpus (110).

The latent topics (158) and associated probability distributions may be learned during the training phase of the topic model (162) (e.g., based on a training corpus (110)). The probability distributions may be thought of as grouping together tokens (116A, 116N) that imply the same latent topic (158). The latent topic (158) assigned to a token (116A) may be the latent topic (158) with the highest probability associated with the token (116A, 116N). In one or more embodiments, a latent topic (158) is identified by a topic identifier. In one or more embodiments, the topic model (162) may be based on latent Dirichlet allocation (LDA) or a dynamic topic model (DMA).

In one or more embodiments, the feature generator (106) includes functionality to tune the semantic vector model (160) by adjusting a hyperparameter of the semantic vector model (160). A hyperparameter is a parameter whose value may be set prior to the training process and adjusted during a separate contextual feature learning process to obtain an optimal contextual feature representation. For example, the hyperparameter may be the embedding size (e.g., the number of dimensions) used in the semantic vector model (160). In one or more embodiments, the feature generator (106) includes functionality to tune the topic model (162) by adjusting a hyperparameter of the topic model (162). For example, the hyperparameter may be the number of latent topics (158) used in the topic modeling.

Figure 1I:
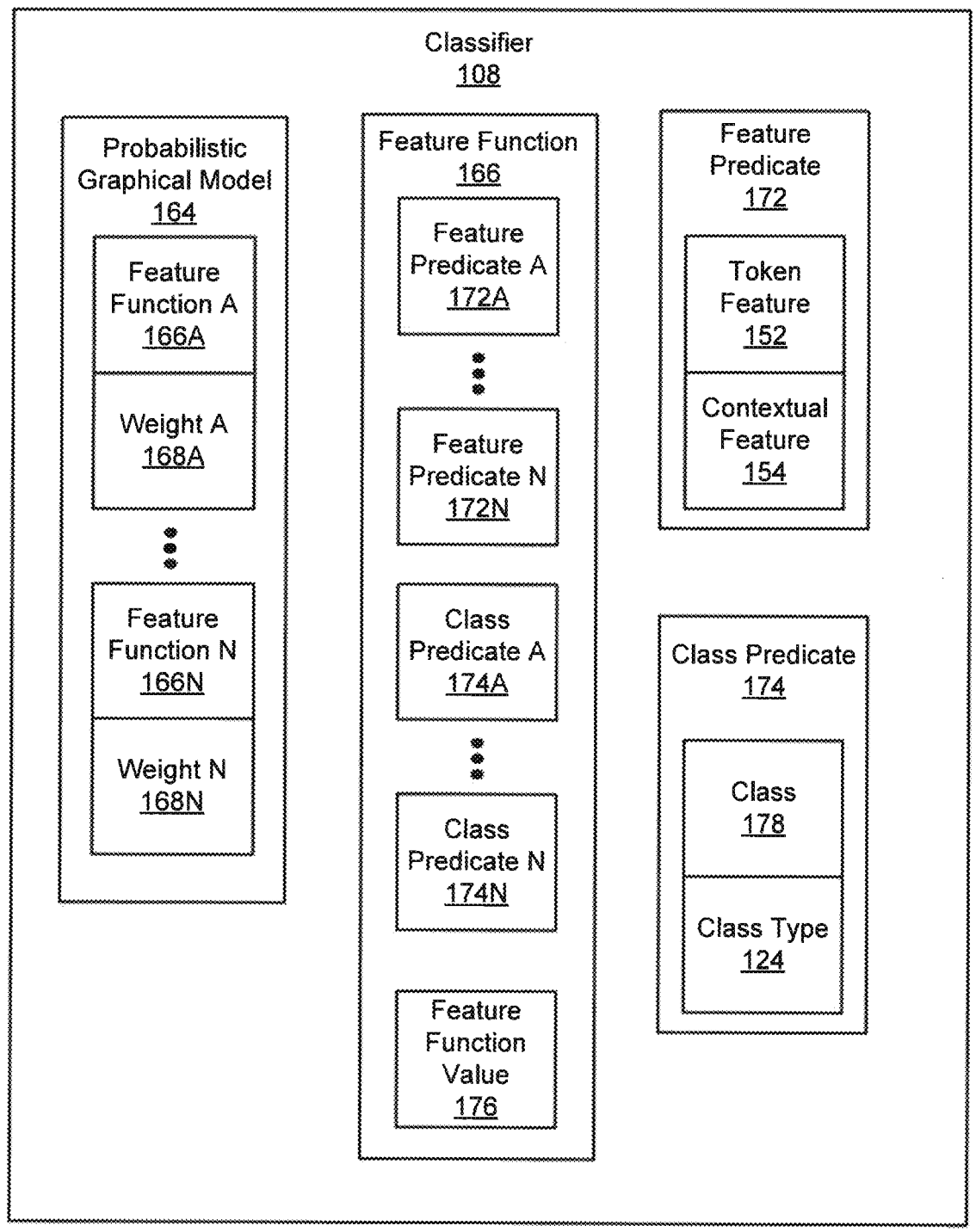

Turning to FIG. 1I, in one or more embodiments, the classifier (108) may be implemented in hardware (e.g., circuitry), software, firmware, and/or any combination thereof. In one or more embodiments, the classifier (108) includes functionality to classify tokens (116A, 116N) as classes (120A, 120N). The classifier (108) may use named entity recognition (NER) to identify the classes (120A, 120N) corresponding to tokens (116A, 116N).

In one or more embodiments, the classifier (108) includes a probabilistic graphical model (164). The probabilistic graphical model (164) may be based on a conditional random field (CRF) model that treats classification as a sequence-prediction problem (e.g., "An Introduction to Conditional Random Fields", Foundations and Trends in Machine Learning, Vol. 4, No. 4 (2011), 267-373, Charles Sutton and Andrew McCallum"). In one or more embodiments, the CRF model assigns a sequence of classes (120A, 120N) to a sequence of random fields conditioned on a sequence of observations, in this case, a sequence of tokens (116A, 116N). The random fields may be viewed as the outputs of the CRF model, and may be referred to as latent states.

The probabilistic graphical model (164) may include feature functions (166A, 166N) and weights (168A, 168N). In one or more embodiments, a feature function (166) includes feature predicates (172A, 172N), class predicates (174A, 174N), and a feature function value (176). Each feature predicate (172) may determine whether a token (116A) in a sequence of tokens (116A, 116N) is a specific token. For example, in FIG. 1J, feature function A (182) includes a feature predicate (190) that indicates whether the token at a current position (i.e., position n) of the sequence is "John". Returning to FIG. 1I, alternatively, a feature predicate (172) may determine whether a token has a specific token feature (152) and/or contextual feature (154) (e.g., a token feature (152) and/or contextual feature (154) generated by the feature generator (106)).

Figure 1J:
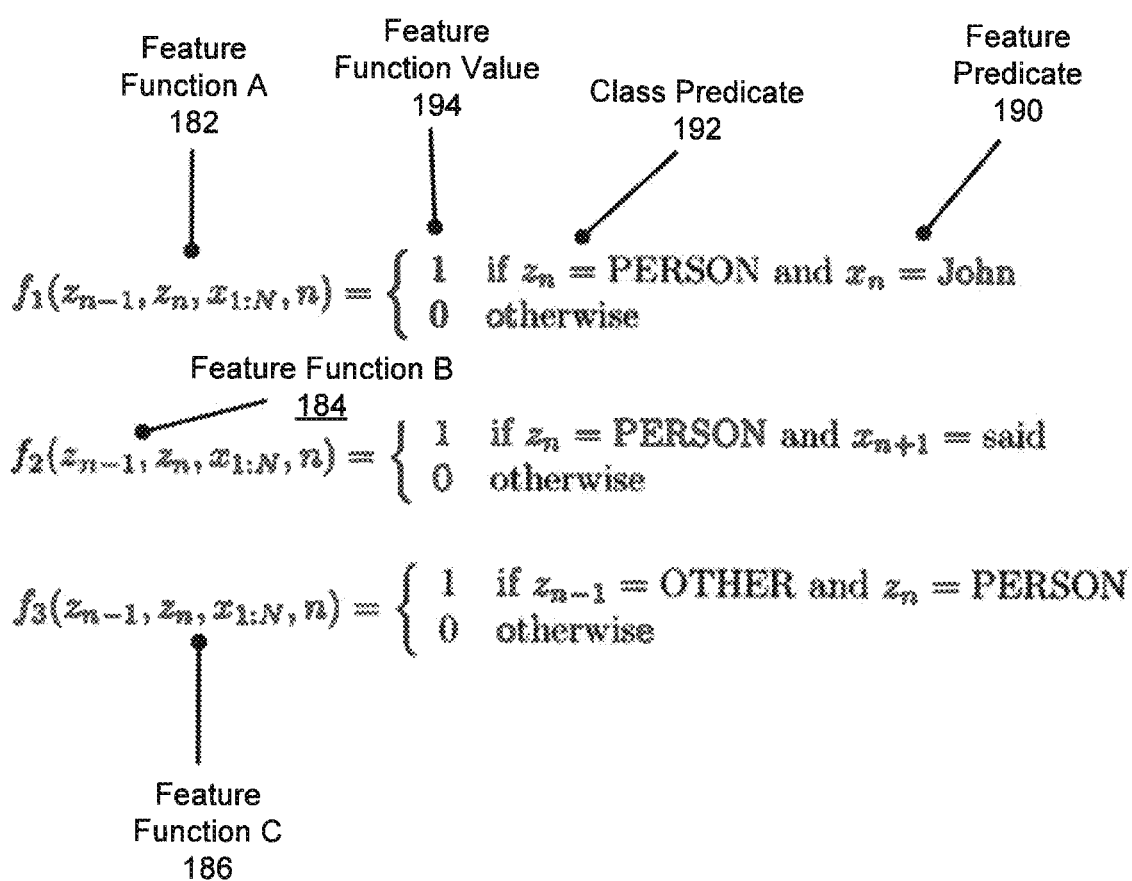

In one or more embodiments, each class predicate (174) may determine whether a token (116A) in a sequence of tokens (116A, 116N) has a specific class (178). FIG. 1J provides a simple illustration of how feature functions (166A, 166N) work. For example, in FIG. 1J, feature function A (182) includes a class predicate (192) that checks whether the class (178) at the current position of the sequence is "PERSON". Returning to FIG. 1I, alternatively, a class predicate (174) may determine whether a token (116A) has a class (178) with a specific class type (124), such as field title (126) or field value (128).

If the CRF model is a linear-chain CRF model, then each class predicate (174) may be based on the class (178) corresponding to the token at the current position and/or the previous position in the sequence. Otherwise, the class predicate (174) may be based on the class (178) corresponding to one or more tokens at any position in the sequence.

In one or more embodiments, the feature function value (176) is the output of a feature function (166). The feature function value (176) may represent the likelihood that the token (116A) at a current position in a sequence of tokens (116A, 116N) is a specific class (178), as indicated by a class predicate (174). Similarly, the feature function value (176) may represent the likelihood that the token (116A) at a current position in a sequence of tokens (116A, 116N) is a class (178) with a specific class type (124).

Returning to FIG. 1J, feature function A (182) has a feature function value (194) of 1 when the class (178) corresponding to the token (116A) at the current position of the sequence is "PERSON" and the token at the current position of the sequence is "John". FIG. 1J also illustrates feature function B (184), whose feature function value is 1 when the class (178) corresponding to the token (116A) at the current position of the sequence is "PERSON" and the token at the next position of the sequence is "said". Feature function A (182) and feature function B (184) both contribute to the likelihood that the class (178) of the token (116A) at the current position of the sequence is "PERSON". Therefore, feature function A (182) and feature function B (184) may be referred to as overlapping feature functions.

In addition, FIG. 1J also illustrates feature function C (186), whose feature function value is 1 when the class (178) corresponding to the token at the previous position of the sequence is "OTHER" and the class (178) corresponding to the token at the current position of the sequence is "PERSON".

Feature function C (186) is an example of a transition function. In one or more embodiments, a transition function may represent the transition of a class predicate (174) from one class (178) to another class (178) relative to adjacent tokens in the sequence. For example, a transition function may represent the relationship of the class (178) of the current token to the class (178) of a neighboring token.

Returning to FIG. 1I, the weight (168N) corresponding to a feature function (166N) may quantify the relative contribution of the feature function (166N) in classifying tokens (116A, 116N). The weights (168A, 168N) may be determined (e.g., iteratively, using a gradient descent optimization) to maximize the conditional log-likelihood of the sequence of tokens (116A, 116N) being labeled by their corresponding classes (120A, 120N) in a training corpus (110). The CRF model may be trained to determine the feature functions (166A, 166N) and corresponding weights (168A, 168N) that best match an annotated version of the training corpus (110).

In one or more embodiments, the probabilistic graphical model (164) may be implemented using probabilistic graphical model libraries such as pycrfsuite (or other libraries with similar functionality). In one or more embodiments, the classifier (108) may be implemented using Python's machine learning libraries such as Scikit-learn.

While FIG. 1A, FIG. 1C, and FIG. 1I show configurations of components, other configurations may be used without departing from the scope of the invention. For example, various components may be combined to create a single component. As another example, the functionality performed by a single component may be performed by two or more components.

Figure 2:
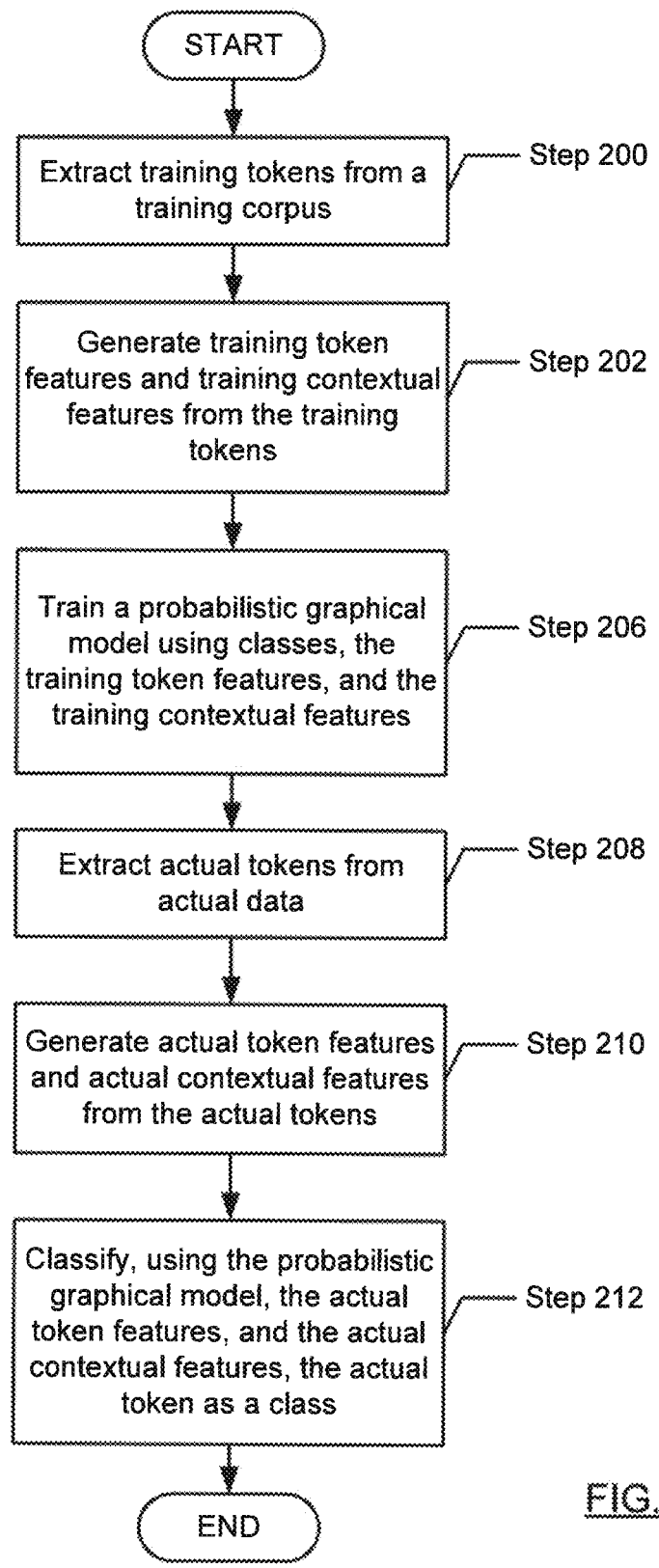
FIG. 2 and FIG. 3 show flowcharts in accordance with one or more embodiments of the invention.

FIG. 2 shows a flowchart in accordance with one or more embodiments of the invention. The flowchart depicts a process for information classification. One or more of the steps in FIG. 2 may be performed by the components (e.g., the token extractor (104), feature generator (106), or classifier (108) of the computer system (100)), discussed above in reference to FIG. 1A, FIG. 1C, and FIG. 1I. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, training tokens are extracted from a training corpus. The training corpus may be extracted from one or more forms. Each training token may be an alphanumeric string that includes one or more words, numerical expressions, etc. Different versions of the training corpus may be used to train different machine learning models. For example, in an annotated version of the training corpus, tokens may be labeled with their corresponding classes (e.g., to support supervised learning).

In Step 202, training token features and training contextual features are generated for each of the training tokens. Training token features may represent intrinsic attributes of the corresponding training token. Examples of token features may include: token length, prefix, suffix, part of speech (POS), pattern (e.g., regular expression pattern), etc. In one or more embodiments, generating the token features for one training token may be performed independently from the generation of token features for any other training token.

Training contextual features may represent attributes of the training token that are inter-related with neighboring training tokens. One example of a contextual feature associated with a training token is a semantic embedding in a semantic vector model (e.g., that defines a multi-dimensional semantic space). In one or more embodiments, a training token may be mapped to a vector (e.g., a point in an embedding space) that represents the token in the multi-dimensional semantic space. The semantic vector model may learn embeddings (e.g., vectors) of tokens to predict surrounding tokens from a given context window. In one or more embodiments, the semantic embedding associated with a training token is the closest semantic embedding to the vector corresponding to the training token in the multi-dimensional semantic space.

Another example of a contextual feature is a latent topic implied by a training token relative to a topic model. A latent topic may be associated with training tokens that are semantically related. The topic model may define probability distributions of latent topics over the documents in the training corpus. The topic model may also define probability distributions of latent topics over the training tokens extracted from the training corpus. The latent topic assigned to a training token may be the latent topic with the highest probability associated with the token.

In Step 206, a probabilistic graphical model is trained using classes, the training token features, and the training contextual features. The probabilistic graphical model may be based on a linear-chain conditional random field (CRF) model that treats classification as a sequence-prediction problem. In one or more embodiments, the CRF model assigns classes to random fields conditioned on a sequence of tokens. The random fields may be viewed as the outputs of the CRF model, and may be referred to as latent states.

In one or more embodiments, classes are categories into which a token may be classified. Each class may include a class type. The class type may represent a grouping of classes having a common characteristic. For example, the common characteristic may be that each class in a group of classes is used as a value of a field in a form. Examples of classes whose class type is field title may include: field title for social security wages box, field title for employer identification number (EIN), etc. Examples of classes whose class type is field value may include: field value for social security number, field value for employer identification number (EIN), field value for wage amount, etc.

The probabilistic graphical model may include feature functions and corresponding weights. In one or more embodiments, a feature function includes feature predicates, class predicates, and a feature function value. Each feature predicate may determine whether a token in a sequence of tokens has a specific token feature and/or contextual feature.

In one or more embodiments, each class predicate may determine whether a token in a sequence of tokens has a specific class. Alternatively, a class predicate may determine whether a token has a class with a specific class type, such as "field title" or "field value".

In one or more embodiments, the feature function value is the output of a feature function. The feature function value may represent the likelihood that the token at a current position in a sequence of tokens has a specific class. Similarly, the feature function value may represent the likelihood that the token at a current position in a sequence of tokens has a specific class type.

A transition function may be based on the transition of a feature predicate or class predicate from one state to another state for adjacent tokens in the sequence. For example, a transition function may represent the transition from the class of one token to the class of an adjacent token. Similarly, a transition function may represent the transition from the class type of one token to the class type of an adjacent token.

The weight corresponding to a feature function may quantify the relative importance and contribution of the feature function in classifying tokens. The weights may be determined (e.g., iteratively, using a gradient descent optimization) to maximize the conditional log-likelihood of the sequence of tokens being labeled by their corresponding classes in an annotated version of the training corpus. The CRF model may be trained until the feature functions and weights converge, or until a predetermined amount of computational resources has been reached.

In Step 208, actual tokens are extracted from actual data (e.g., see description of Step 200 above). That is, once the probabilistic graphical model has been trained, the focus may turn to processing actual tokens in actual data. In one or more embodiments, the actual token may be part of an actual token sequence extracted from the actual data.

In Step 210, actual token features and actual contextual features are generated for each of the actual tokens (e.g., see description of Step 202 above).

In Step 212, the actual token is classified as a class, using the probabilistic graphical model, the actual token features, and the actual contextual features. That is, once the probabilistic graphical model is trained in Step 206 above, the probabilistic graphical model may be used to classify actual tokens extracted from the actual data. For example, the feature functions of the probabilistic graphical model may be applied to the actual token features and the actual contextual features of the actual tokens.

In one or more embodiments, a probability may be calculated for each class included in a class predicate of one or more feature functions. The probability may be based on the feature function value resulting from applying each feature function to the actual token, as well as the weight corresponding to the feature function. The actual token may be classified as an instance of the class whose corresponding probability is the highest compared to the probability corresponding to any other class.

Figure 3:
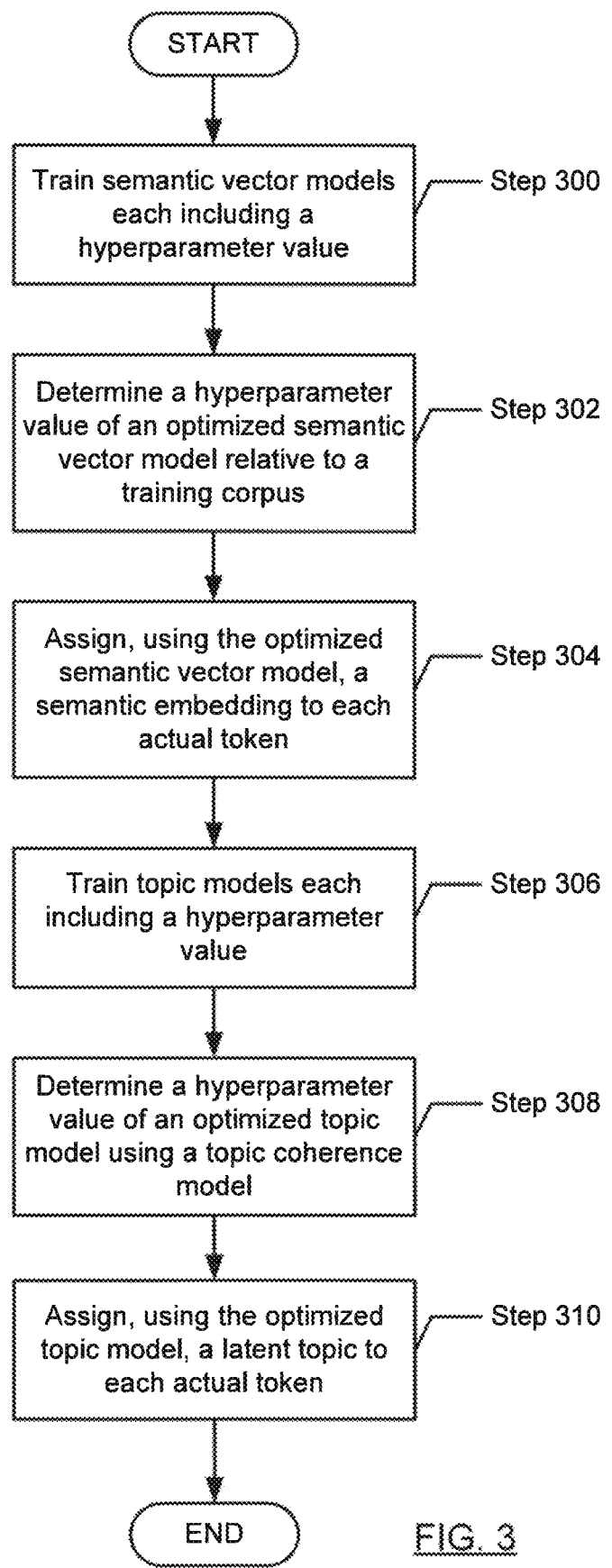

FIG. 3 shows a flowchart in accordance with one or more embodiments of the invention. The flowchart depicts a process for information classification. One or more of the steps in FIG. 3 may be performed by the components (e.g., the token extractor (104), feature generator (106), or classifier (108) of the computer system (100)), discussed above in reference to FIG. 1A, FIG. 1C, and FIG. 1I. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, semantic vector models each including a hyperparameter value are trained. A hyperparameter may be a parameter whose value is set prior to the training process. For example, the hyperparameter may be the embedding size (e.g., the number of dimensions) used in the semantic vector model (e.g., using Word2Vec). In one or more embodiments, various semantic vector models, each having a different value of the hyperparameter, may be trained using an annotated version of the training corpus (e.g., or some other corpus used for tuning purposes).

In Step 302, the hyperparameter value of an optimized semantic vector model that best matches the training corpus is determined. In one or more embodiments, the determination is based on evaluating, using a metric, the trained semantic vector models of Step 300 above. In one or more embodiments, the metric may be the interclass-to-interclass distance ratio. The intraclass-to-interclass distance ratio measures the degree to which the learned embeddings (e.g., vectors) for tokens of the same class are close and the vectors for tokens of different classes are as far apart as possible. The optimized semantic vector model may correspond to the smallest intraclass-to-interclass distance ratio relative to an annotated version of the training corpus.

In one or more embodiments, the intraclass distance for a class C may be calculated as the average pairwise cosine similarity between all tokens annotated with class C in the training corpus. In one or more embodiments, the interclass distance may be calculated as the average pairwise cosine distances between tokens annotated with different classes in an annotated version of the training corpus. The optimized semantic vector model may be the semantic vector model whose intraclass-to-interclass distance ratio is the smallest.

In Step 304, a semantic embedding is assigned to each training token in the training corpus using the optimized semantic vector model. In one or more embodiments, the semantic embedding assigned to the training token is the closest semantic embedding to the vector corresponding to the training token in the multi-dimensional semantic space. The semantic embedding may be identified by a cluster identifier.

In one or more embodiments, a semantic embedding is assigned to each actual token extracted from actual data (e.g., once the semantic vector model has been trained) using the optimized semantic vector model.

In Step 306, topic models each including a hyperparameter value are trained. For example, the hyperparameter may be the number of latent topics used in the topic model. In one or more embodiments, various topic models, each having a different value of the hyperparameter, may be trained using a training corpus (e.g., or some other corpus used for tuning purposes).

In Step 308, the hyperparameter value of an optimized topic model that best matches the training corpus is determined. In one or more embodiments, the determination is based on evaluating, using a common topic coherence model, the trained topic models of Step 306 above. The optimized topic model may correspond to the highest topic coherence relative to the topic coherence model. The topic coherence may be based on segmenting the topics into comparison sets, calculating probabilities for token occurrence relative to each topic, calculating pairwise cosine similarities between the segmented comparison sets as confirmation measures, and aggregating the results (e.g., by calculating an arithmetic mean) into a single topic coherence measure. For example, topic coherence may be measured using the topic coherence pipeline (e.g., segmentation, probability calculation, confirmation measures, and aggregation) of Roder, et al ("Exploring the Space of Topic Coherence Measures", Roder, Michael, Both, Andreas, and Hinneburg, Alexander, WSDM'15, Feb. 2-6, 2015, Shanghai, China).

In Step 310, a latent topic is assigned to each training token in the training corpus using the optimized topic model. In one or more embodiments, the latent topic assigned to a token may be the latent topic with the highest probability associated with the token. The latent topic may be identified by a topic identifier.

In one or more embodiments, a latent topic is assigned to each actual token extracted from actual data (e.g., once the semantic vector model has been trained) using the optimized topic model.

Experiments using a prototype implementation of the techniques embodied in FIG. 2 and FIG. 3 demonstrated an overall precision exceeding 96% on a medium-scale data set that included over 50,000 tokens extracted from sample W-2 forms.

Figures 4A, 4B:
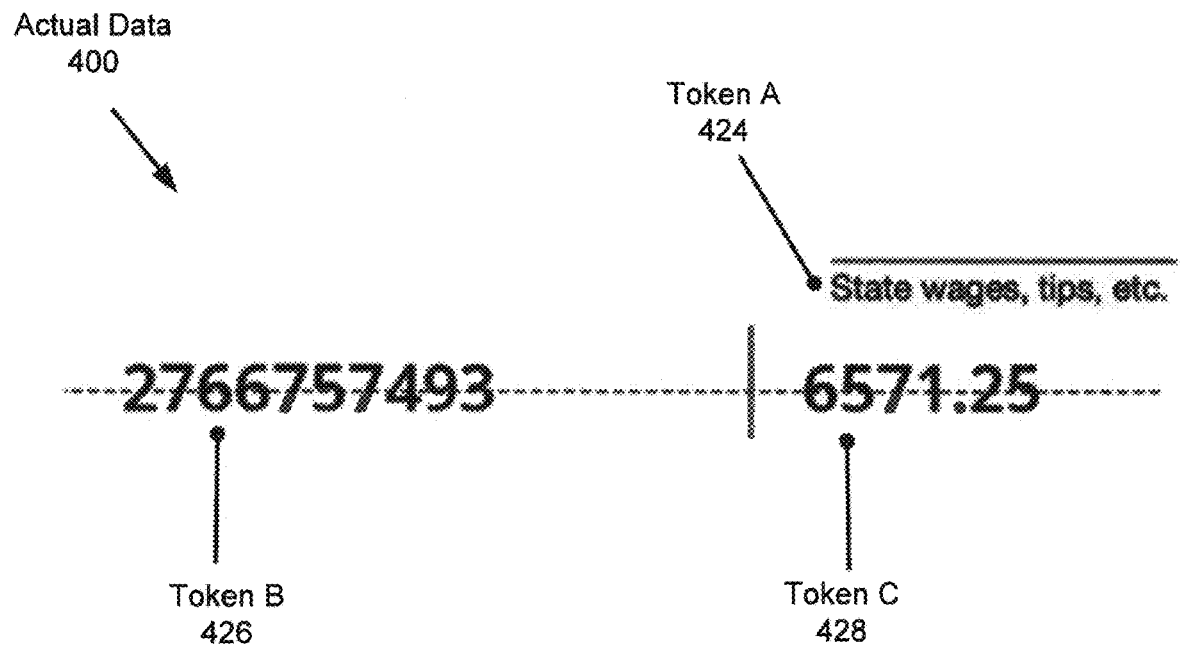
FIG. 4A, FIG. 4B, and FIG. 4C show examples in accordance with one or more embodiments of the invention.
Figure 4C:
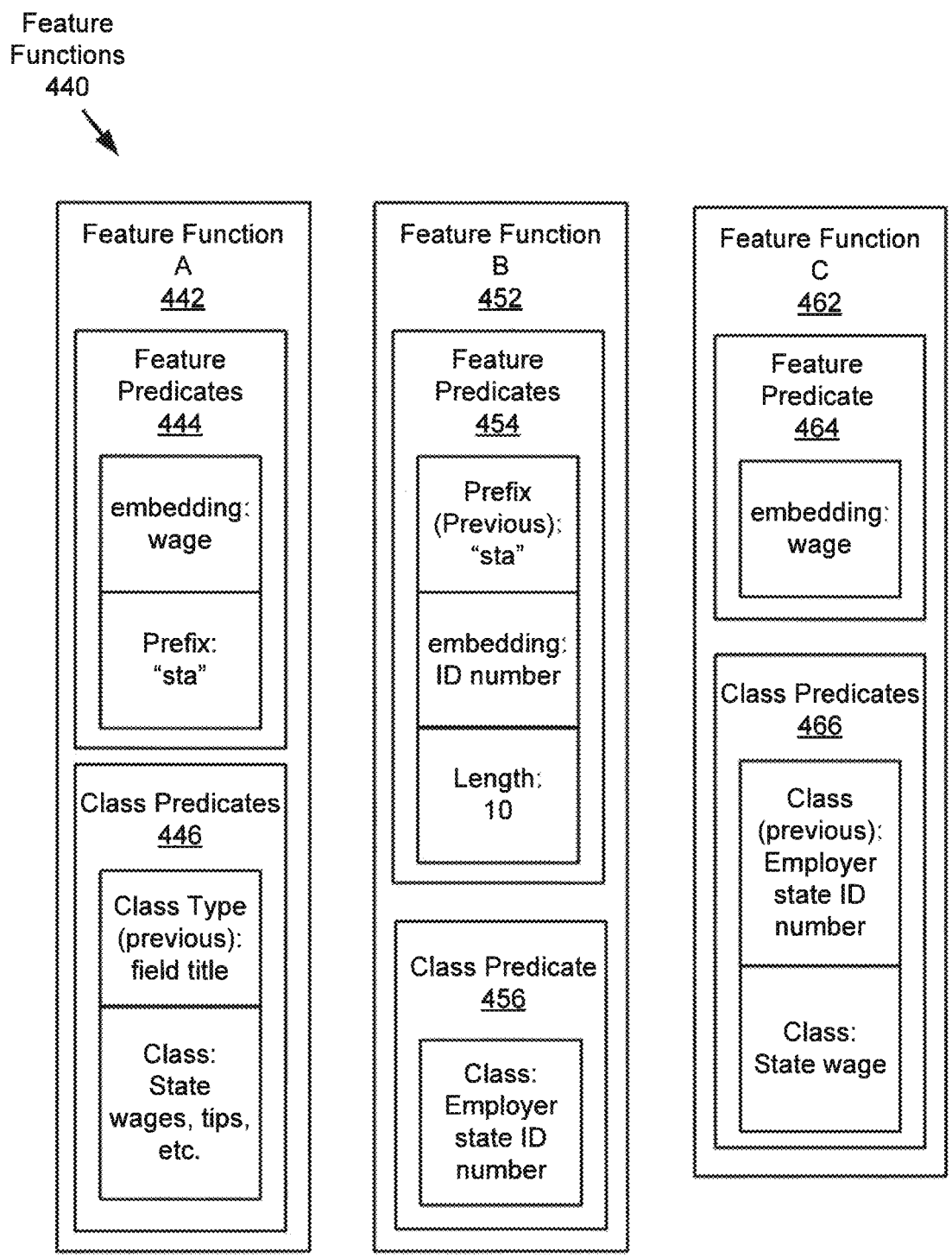

The following example is for explanatory purposes only and not intended to limit the scope of the invention. FIG. 4A, FIG. 4B, and FIG. 4C show an implementation example in accordance with one or more embodiments of the invention.

Initially, during the training phase, the token extractor ((104) in FIG. 1A) extracts a sequence of tokens ((116A, 116N) in FIG. 1A) from a training corpus ((110) in FIG. 1A), in this case, a corpus of synthetic W-2 forms. Next, the feature generator ((106) in FIG. 1A) generates (intrinsic) token features and contextual features for each training token. The token features are generated using an annotated version of the training corpus (110) in which each training token is annotated with its corresponding class. Each class has a class type, which is either field title or field value. The contextual features include a semantic embedding defined relative to a semantic vector model and a latent topic defined relative to a topic model. The feature generator (106) uses a semantic vector model with an embedding size (e.g., 200) that minimizes the interclass-to-interclass distance ratio of the semantic vector model relative to the training corpus (110). The feature generator (106) uses a topic model with the number of latent topics that maximizes the level of topic coherence.

Next, the classifier ((108) in FIG. 1A) trains a probabilistic graphical model using the training corpus (110), the classes, and the token features and contextual features generated by the feature generator (106). The probabilistic graphical model is based on a linear-chain conditional random field (CRF) model that treats classification as a sequence-prediction problem. The probabilistic graphical model includes feature functions, each including feature predicates, class predicates, and a feature function value. In this example, the feature function value of each feature function is 1, when triggered, and zero otherwise.

FIG. 4A illustrates a portion of actual data (400) ((112) in FIG. 1A), in this case, an actual W-2 form. As illustrated in FIG. 4A, the token extractor (104) extracts, from the actual data (400), a token sequence that includes token A (424), token B (426), and token C (428). Then, the feature generator (106) generates token features and contextual features for each token in the token sequence. FIG. 4B shows the features (430) associated with token A (424), token B (426), and token C (428).

Next, the classifier (108) applies feature functions (440) to each token (424, 426, 428). As shown in FIG. 4C, feature function A (442) includes the following feature predicates (444):
1) is the semantic embedding of the current token "wage"?
2) is the prefix of the current token "stag"?

Feature function A (442) includes the following class predicates (446):
1) is the class type of the previous token "field title"? Although the token preceding token A (424) is not shown in FIG. 4A, in this example, the token preceding token A (424) is known to have a class type of "field title".
2) is the class of the current token "State wages, tips, etc."?

The feature predicates (444) of feature function A (442) are both true for token A (424). As mentioned above, the first of the class predicates (446) of feature function A (442) is true for the token preceding token A (424). Therefore, feature function A (442) is triggered for token A (424) and the classifier (108) associates a probability with the class of "State wages, tips, etc.", using the second of the class predicates (446) of feature function A (442). The probability is based on the feature function value of 1, multiplied by a weight corresponding to feature function A (442). The class of "State wages, tips, etc." is associated with the class type "field title".

In this example, the probability associated with the class of "State wages, tips, etc." is high because feature function A (442) has a large corresponding weight, and thus the classifier (108) classifies token A (424) as the class "State wages, tips, etc.".

Feature function B (452) includes the following feature predicates (454):
1) is the prefix of the previous token "sta"?
2) is the semantic embedding of the current token "ID number"?
3) is the token length of the current token 10?

Feature function B (452) includes the following class predicate (456):
1) is the class of the current token "employer state ID number"?

The feature predicates (454) of feature function B (452) are true for token B (426). Therefore, feature function B (452) is triggered for token B (426) and the classifier (108) associates a probability with the class of "employer state ID number", using the class predicate (456) of feature function B (452). The probability is based on the feature function value of 1, multiplied by a weight corresponding to feature function B (452). The class of "employer state ID number" is associated with the class type "field value".

In this example, the probability associated with the class of "employer state ID number" is high because feature function B (452) has a large corresponding weight, and thus the classifier (108) classifies token B (426) as the class "employer state ID number".

Feature function C (462) includes the following feature predicate (464):
1) is the semantic embedding of the current token "wage"?

Feature function C (462) includes the following class predicates (466):
1) is the class of the previous token "employer state ID number"?
2) is the class of the current token "state wage"?

Feature function C (462) is based on the observation (e.g., learned from the training corpus (110)) that a token whose class is "state wage" may follow a token whose class is "state ID number", especially when the semantic embedding associated with the previous token is "wage".

The feature predicate (464) of feature function C (462) is true for token C (428). In addition, the first of the class predicates (466) of feature function C (462) of feature function C (462) is true, since the previous token (i.e., token B (426)) was assigned the class "employer state ID number". Therefore, feature function C (462) is triggered for token C (428) and the classifier (108) associates a probability with the class of "state wage", using the second of the class predicates (466) of feature function C (462). The probability is based on the feature function value of 1, multiplied by a weight corresponding to feature function C (462). The class of "state wage" is associated with the class type "field value".

In this example, the probability associated with the class of "state wage" is high because feature function C (462) has a large corresponding weight, and thus the classifier (108) classifies token C (428) as the class "state wage".

Figure 5A:
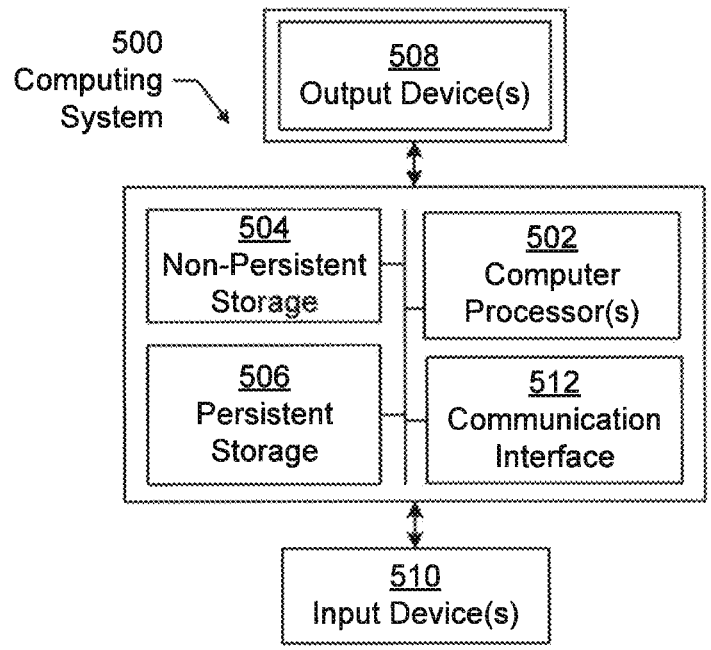
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
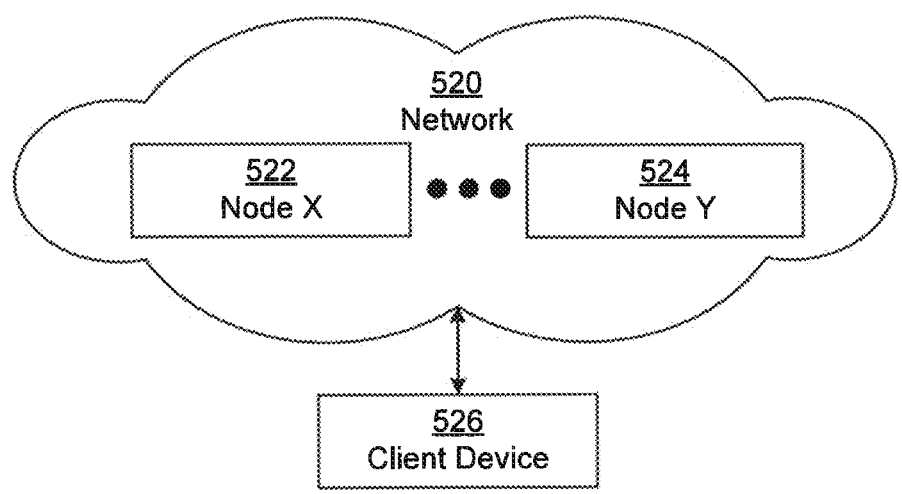

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   extracting, from actual data, a plurality of actual tokens comprising a first actual token;
   generating actual token features and actual contextual features for each of the plurality of actual tokens; and
   classifying the first actual token as a first class of a plurality of classes using the actual token features, the actual contextual features, and a probabilistic graphical model that was trained by:
      extracting training tokens from a training corpus;
      generating training token features and training contextual features for each of the training tokens;
      generating a first feature function comprising a first class predicate for determining whether a token in a sequence of tokens has the first class.

2. The method of claim 1, further comprising:
   obtaining a plurality of class types comprising a first class type and a second class type, wherein each of the plurality of classes comprises one of the plurality of class types, and wherein the first class comprises the first class type; and
   classifying, using the probabilistic graphical model, the actual token features, and the actual contextual features, a second actual token of the plurality of actual tokens as a second class of the plurality of classes, wherein the second class comprises the second class type.

3. The method of claim 2, further comprising:
   calculating a feature function value for the first actual token using each of a plurality of feature functions;
   wherein the first actual token is classified using the first feature function.

4. The method of claim 3, wherein classifying the first actual token as the first class comprises:
   assigning a weight to each of the plurality of feature functions;
   calculating, for each of the plurality of classes, one or more feature function values by applying, to the first actual token, each of the plurality of feature functions comprising a class predicate comprising the respective class;

calculating, for the respective class and the first actual token, a result by multiplying each of the one or more feature function values by the weight assigned to the feature function corresponding to the respective feature function value; and determining that the result for the first class exceeds the result for any other class of the plurality of classes.

5. The method of claim 1, wherein generating the contextual features for each actual token comprises:

assigning a semantic embedding to the actual token using an optimized semantic vector model; and assigning a latent topic to the actual token using an optimized topic model.

6. The method of claim 5, further comprising:

training a plurality of semantic vector models each comprising a hyperparameter value, the plurality of semantic vector models comprising the optimized semantic vector model;

evaluating, using a metric and the training corpus, the plurality of semantic vector models; and in response to the evaluating, determining that the hyperparameter value of the optimized semantic vector model best matches the training corpus.

7. The method of claim 5, further comprising:

training a plurality of topic models each comprising a hyperparameter value, the plurality of topic models comprising the optimized topic model;

evaluating, using a topic coherence model, a plurality of topic coherence results corresponding to the plurality of topic models; and in response to the evaluating, determining that the hyperparameter value of the optimized topic model provides a highest topic coherence result of the plurality of topic coherence results.

8. The method of claim 3, wherein the probabilistic graphical model that was further trained by:

generating a plurality of feature functions each comprising a class predicate comprising one of the plurality of classes.

9. A system, comprising:

a computer processor;

a repository storing a training corpus, actual data, and a plurality of classes comprising a first class;

a token extractor executing on the computer processor configured to:

extract training tokens from the training corpus; and extract, from the actual data, a plurality of actual tokens comprising a first actual token;

a feature generator executing on the computer processor configured to:

generate training token features and training contextual features for each of the training tokens; and generate actual token features and actual contextual features for each of the plurality of actual tokens; and a classifier comprising a probabilistic graphical model and executing on the computer processor, wherein the classifier is configured to:

train the probabilistic graphical model using the plurality of classes, the training token features, and the training contextual features, wherein training the probabilistic graphical model comprises:

generating a first feature function comprising a first class predicate for determining whether a token in a sequence of tokens has a first one of a plurality of class types; and classify the first actual token as the first class using the probabilistic graphical model, the actual token features, and the actual contextual features.

10. The system of claim 9, wherein the repository is further configured to store a plurality of class types comprising a first class type and a second class type, wherein each of the plurality of classes comprises one of the plurality of class types, wherein the first class comprises the first class type, and wherein the classifier is further configured to:

classify, using the probabilistic graphical model, the actual token features, and the actual contextual features, a second actual token of the plurality of actual tokens as a second class of the plurality of classes, wherein the second class comprises the second class type.

11. The system of claim 10, wherein the feature generator is further configured to:

generate a feature function comprising a class predicate comprising one of the plurality of class types.

12. The system of claim 10, wherein the feature generator is further configured to:

generate a plurality of feature functions each comprising a class predicate comprising one of the plurality of classes, wherein the plurality of feature functions comprises a first feature function comprising a first class predicate comprising the first class, wherein each of the plurality of feature functions calculates a feature function value for the first actual token, and wherein the first actual token is classified using the first feature function.

13. The system of claim 12, wherein the classifier is further configured to classify the first actual token as the first class by:

assigning a weight to each of the plurality of feature functions;

calculating, for each of the plurality of classes, one or more feature function values by applying, to the first actual token, each of the plurality of feature functions comprising a class predicate comprising the respective class;

calculating, for the respective class and the first actual token, a result by multiplying each of the one or more feature function values by the weight assigned to the feature function corresponding to the respective feature function value; and determining that the result for the first class exceeds the result for any other class of the plurality of classes.

14. The system of claim 9, wherein the feature generator comprises an optimized semantic vector model and an optimized topic model, wherein the feature generator is further configured to:

assign a semantic embedding to the actual token using the optimized semantic vector model; and assign a latent topic to the actual token using the optimized topic model.

15. The system of claim 14, wherein the feature generator is further configured to:

train a plurality of semantic vector models each comprising a vector hyperparameter value, the plurality of semantic vector models comprising the optimized semantic vector model;

evaluate, using a metric and the training corpus, the plurality of semantic vector models;

in response to the evaluation, determine that the vector hyperparameter value of the optimized semantic vector model best matches the training corpus;

train a plurality of topic models each comprising a topic hyperparameter value, the plurality of topic models comprising the optimized topic model;

evaluate, using a topic coherence model, a plurality of topic coherence results corresponding to the plurality of topic models; and in response to the evaluation, determine that the topic hyperparameter value of the optimized topic model provides a highest topic coherence result of the plurality of topic coherence results.

16. A non-transitory computer readable medium comprising instructions that, when executed by a processor, perform:

extracting training tokens from a training corpus;

generating training token features and training contextual features for each of the training tokens;

training a probabilistic graphical model using a plurality of classes, the training token features, and the training contextual features, wherein the training comprises:
generating a first feature function comprising a first class predicate for determining whether a token in a sequence of tokens has a first one of a plurality of class types;

extracting, from actual data, a plurality of actual tokens comprising a first actual token;

generating actual token features and actual contextual features for each of the plurality of actual tokens; and classifying the first actual token as a first class of the plurality of classes using the probabilistic graphical model, the actual token features, and the actual contextual features.

17. The non-transitory computer readable medium of claim 16, further comprising instructions that perform:
obtaining a plurality of class types comprising a first class type and a second class type, wherein each of the plurality of classes comprises one of the plurality of class types, and wherein the first class comprises the first class type; and classifying, using the probabilistic graphical model, the actual token features, and the actual contextual features, a second actual token of the plurality of actual tokens as a second class of the plurality of classes, wherein the second class comprises the second class type.

18. The non-transitory computer readable medium of claim 16, further comprising instructions that perform;
generating a plurality of feature functions each comprising a class predicate comprising one of the plurality of classes, wherein the plurality of feature functions comprises a first feature function comprising a first class predicate comprising the first class, wherein each of the plurality of feature functions calculates a feature function value for the first actual token, wherein the first actual token is classified using the first feature function.

19. The non-transitory computer readable medium of claim 18, wherein classifying the first actual token as the first class comprises:
assigning a weight to each of the plurality of feature functions;

calculating, for each of the plurality of classes, one or more feature function values by applying, to the first actual token, each of the plurality of feature functions comprising a class predicate comprising the respective class;

calculating, for the respective class and the first actual token, a result by multiplying each of the one or more feature function values by the weight assigned to the feature function corresponding to the respective feature function value; and determining that the result for the first class exceeds the result for any other class of the plurality of classes.

20. The non-transitory computer readable medium of claim 16, further comprising instructions that perform:
assigning a semantic embedding to the actual token using an optimized semantic vector model; and assigning a latent topic to the actual token using an optimized topic model.

* * * * *